(12) United States Patent
Bird (10) Patent No.: US 7,131,819 B2
(45) Date of Patent: *Nov. 7, 2006

(54) HIGH EFFICIENCY CEILING FAN

(75) Inventor: Gregory Michael Bird, Collierville, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/326,908

(22) Filed: Jan. 7, 2006

(65) Prior Publication Data

US 2006/0115361 A1   Jun. 1, 2006

Related U.S. Application Data

(63) Continuation of application No. 10/837,934, filed on May 3, 2004, which is a continuation-in-part of application No. 10/194,699, filed on Jul. 11, 2002, now Pat. No. 6,733,241.

(51) Int. Cl.
*F04D 29/38* (2006.01)
(52) U.S. Cl. ........................... 416/238; 416/243
(58) Field of Classification Search ................ 416/238, 416/242, 243, 223 R, DIG. 2, DIG. 5
See application file for complete search history.

(56) References Cited

U.S. PATENT DOCUMENTS

| 4,782,213 A | 11/1988 | Teal |
| 4,892,460 A | 1/1990 | Volk |
| 4,974,633 A | 12/1990 | Hickey |
| 5,033,113 A | 7/1991 | Wang |
| 5,244,349 A | 9/1993 | Wang |
| 5,681,145 A | 10/1997 | Neely et al. |
| 6,039,541 A * | 3/2000 | Parker et al. ........... 416/223 R |
| 6,341,940 B1 | 1/2002 | Giribaldi |
| 6,733,241 B1 * | 5/2004 | Bird .......................... 416/238 |

FOREIGN PATENT DOCUMENTS

GB           676406         7/1952

OTHER PUBLICATIONS

Merriam-Webster's Collegiate Dictionary, Tenth Edition, pp. 21a, 22a, 14 and 941.*

* cited by examiner

*Primary Examiner*—Richard A. Edgar
(74) *Attorney, Agent, or Firm*—Baker Donelson et al.

(57) ABSTRACT

Ceiling fan energy consumption efficiency is enhanced with fan blades that have an angle attack that decreases from root end to tip end at higher rates of decrease nearer their tip ends than at their root ends.

4 Claims, 5 Drawing Sheets

HIGH EFFICIENCY CEILING FAN

REFERENCE TO RELATED APPLICATION

This is a continuation of application Ser. No. 10/837,934, filed May 3, 2004, which is a continuation-in-part of application Ser. No. 10/194,699 filed Jul. 11, 2002 now U.S. Pat. No. 6,733,241.

TECHNICAL FIELD

This invention relates generally to ceiling fans, and specifically to electrically powered ceiling fans and their efficiencies.

BACKGROUND OF THE INVENTION

Ceiling fans powered by electric motors have been used for years in circulating air. They typically have a motor within a housing mounted to a downrod that rotates a set of fan blades about the axis of the downrod. Their blades have traditionally been flat and oriented at an incline or pitch to present an angle of attack to the air mass in which they rotate. This causes air to be driven downwardly.

When a fan blade that extends generally radially from its axis of rotation is rotated, its tip end travels in a far longer path of travel than does its root end for any given time. Thus its tip end travels much faster than its root end. To balance the load of wind resistance along the blades, and the air flow generated by their movement, fan blades have been designed with an angle of attack that diminishes towards the tip. This design feature is also conventional in the design of other rotating blades such as marine propellers and aircraft propellers.

In 1997 a study was conducted at the Florida Solar Energy Center on the efficiencies of several commercially available ceiling fans. This testing was reported in U.S. Pat. No. 6,039,541. It was found by the patentees that energy efficiency, i.e. air flow (CFM) per power consumption (watts), was increased with a fan blade design that had a twist in degrees at its root end that tapered uniformly down to a smaller twist or angle of attack at its tip end. For example, this applied to a 20-inch long blade (with tapered chord) that had a 26.7° twist at its root and a 6.9° twist at its tip.

Another long persistent problem associated with ceiling fans has been that of air flow distribution. Most ceiling fans have had their blades rotate in a horizontal plane, even though oriented at an angle of attack. This has served to force air downwardly which does advantageously provide for air flow in the space beneath the fan. However air flow in the surrounding space has been poor since it does not flow directly from the fan. Where the fan blades have been on a dihedral this problem has been reduced. However this has only been accomplished at the expense of a substantial diminution of air flow directly beneath the fan.

SUMMARY OF THE INVENTION

It has now been found that a decrease in angle of attack or twist that is of a uniform rate is not the most efficient for ceiling fans. The tip of a 2-foot blade or propeller travels the circumferences of a circle or $2\pi(2)$ in one revolution. Thus its midpoint one foot out travels $2\pi(1)$ or half that distance in one revolution. This linear relation is valid for an aircraft propeller as its orbital path of travel is generally in a plane perpendicular to its flight path. A ceiling fan however rotates in an orbital path that is parallel to and located below an air flow restriction, namely the ceiling itself. Thus its blades do not uniformly attack an air mass as does an aircraft. This is because "replacement" air is more readily available at the tips of ceiling fan blades than inboard of their tips. Air adjacent their axis of rotation must travel from ambience through the restricted space between the planes of the ceiling and fan blades in reaching their root ends.

With this understanding in mind, ceiling fan efficiency has now been found to be enhanced by forming their blades with an angle of attack that increases non-uniformly from their root ends to their tip ends. More specifically, it has been found that the rate of change in angle of attack or pitch should be greater nearer the blade tip than nearer its root. This apparently serves to force replacement air inwardly over the fan blades beneath the ceiling restriction so that more air is more readily available nearer the root ends of the blades. But whether or not this theory is correct the result in improved efficiency has been proven. By having the change in angle of attack at a greater rate at their tip than at their roots, fan efficiency has been found to be substantially enhanced.

DETAILED DESCRIPTION

The fan blade technology disclosed in U.S. Pat. No. 6,039,541 followed the assumption that all air flow into the fan blades is from a direction that is perpendicular to the plane of rotation for the blades. In addition, it assumed that the airflow is of a constant velocity from the root end to the tip end of the blades as used in aircraft propeller theory. Using this assumption the blades were designed with a constant twist rate from root end to tip end.

Twisting of the blade is done in an attempt to optimize the relative angle of attack of the airflow direction relative to the blade surface. This is done to ensure that the blade is operating at its optimum angle of attack from root end to tip end. This angle changes to accommodate the fact that the tip of the blade moves faster than the root end of the blade diameter. This increase in velocity changes the direction of the relative wind over the blade.

Again, this assumption has now been found to be invalid for ceiling fans. Ceiling fans are air re-circulating devices that do not move through air as an aircraft propeller does. Air does not move in the same vector or even velocity over their blades from root end to tip end.

Figure 1:
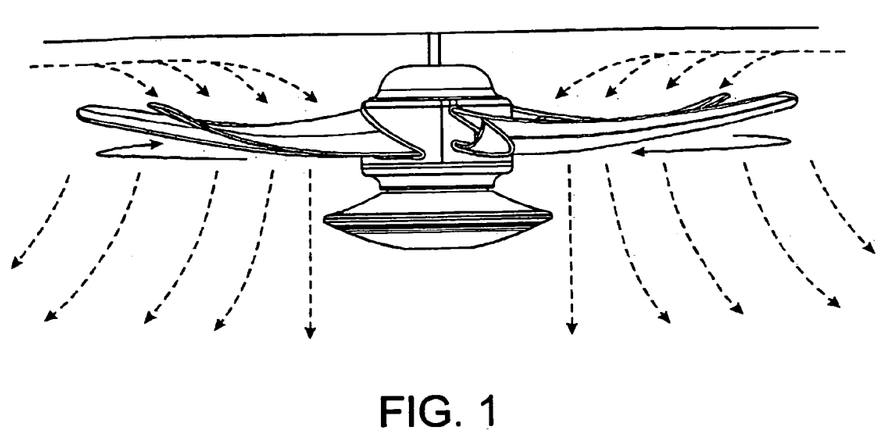
FIG. 1 is a side view of a ceiling fan that embodies the invention in its preferred form.

FIG. 1 illustrates a ceiling fan that is of conventional construction with the exception of the shape of its blades. The fan is seen to be mounted beneath a ceiling by a downrod that extends from the ceiling to a housing for an electric motor and switch box. Here the fan is also seen to have a light kit at its bottom. Power is provided to the motor that drives the blades by electrical conductors that extend through the downrod to a source of municipal power.

The fan blades are seen to be twisted rather than flat and to have a graduated dihedral. Air flow to and from the fan blades is shown by the multiple lines with arrowheads. From these it can be visually appreciated how the fan blades do not encounter an air mass as does an airplane propeller. Rather, the restricted space above the blades alters the vectors of air flow into the fan contrary to that of an aircraft.

Figure 2:
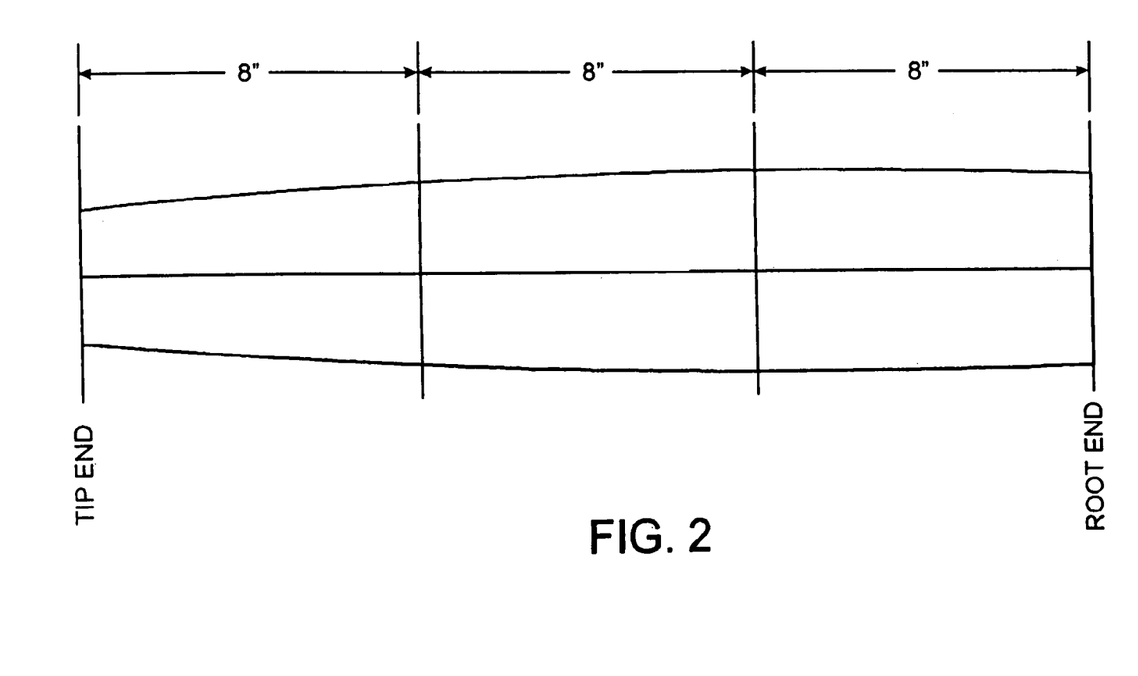
FIG. 2 is a diagrammatical view of a fan blade of FIG. 1 shown hypothetically in a planar form for illustrative purposes.

Each fan blade is tapered with regard to its width or chord as shown diagrammatically in FIG. 2. Each tapers from base or root end to tip end so as to be narrower at its tip. In addition, each preferably has a dihedral as shown in FIG. 1 although that is not necessary to embody the advantages of the invention. The dihedral is provided for a wider distribution of divergence of air in the space beneath the fan.

Figure 3:
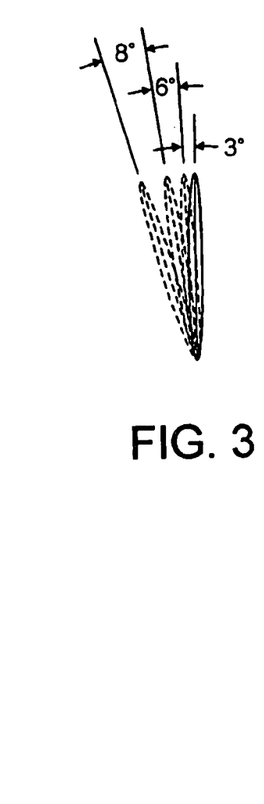
FIG. 3 is a diagrammatical view of the fan blade of FIG. 2 illustrating degrees of blade twist at different locations along the blade.

With continued reference to FIGS. 2 and 3 it is seen that the blade is demarked to have three sections although the blade is, of course, of unitary construction. Here the 24-inch long blade has three sections of equal lengths, i.e. 8 inches each. All sections are twisted as is evident in FIG. 1. However, the rate of twist from root to tip is nonuniform. The twist or angle of attack deceases from root end down to 10° at the tip end. This decrease, however, which is also apparent in FIG. 1, is at three different rates. In the first 8-inch section adjacent the root end the change in twist rate is 0.4° per inch. For the mid section it is 0.7° per inch. For the third section adjacent the tip it is at a change rate of 1.0° per inch. Of course there is a small transition between each section of negligible significance. Thus in FIG. 3 there is an 8° difference in angle of attack from one end of the outboard section to its other (1° per inch×8 inches). For the mid section there is about 6° difference and for the inboard section about 3°.

Figures 5, 6, 7:
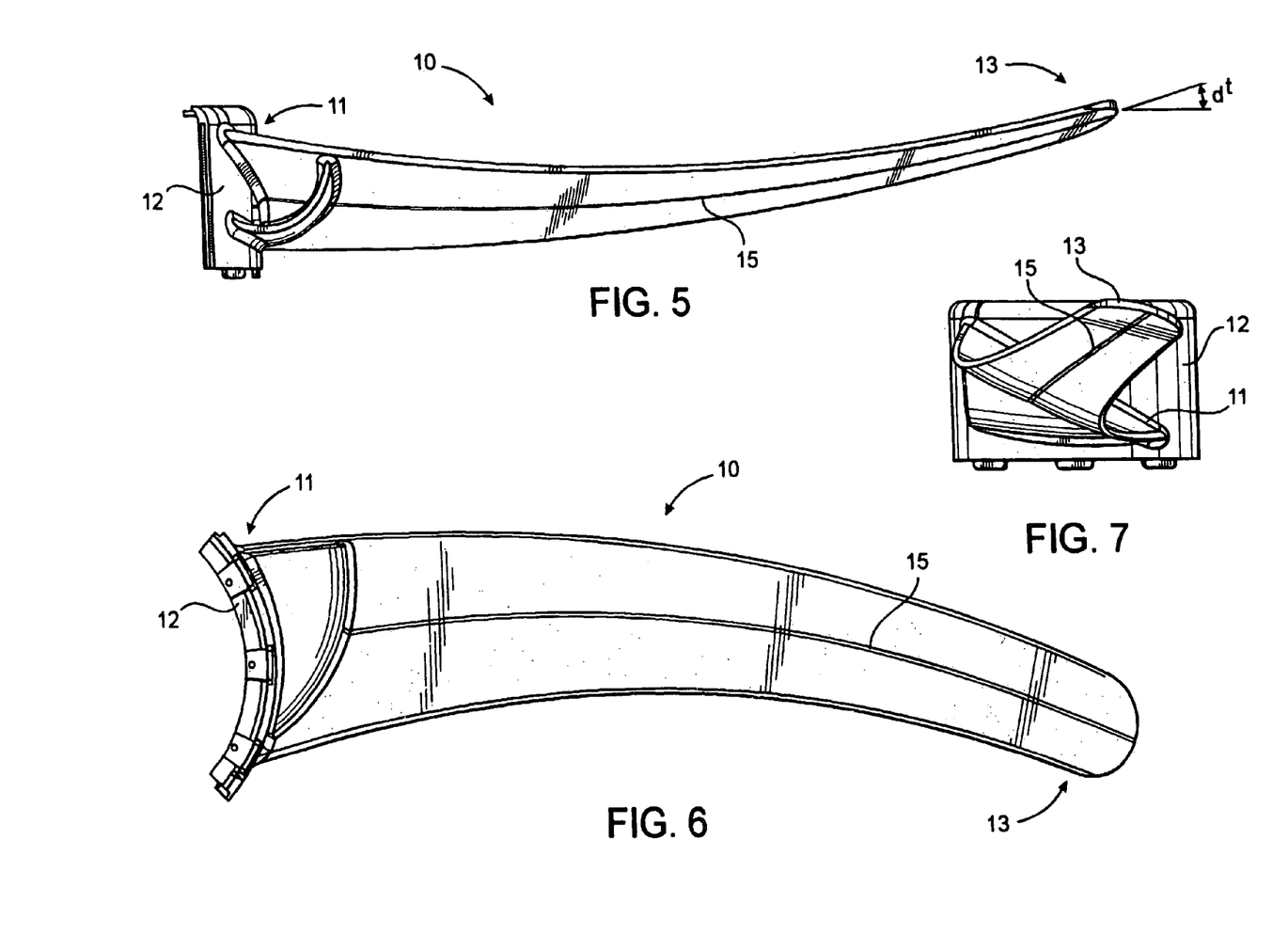
FIG. 5 is a side view of one of the blades of the fan shown in FIG. 1.
FIG. 6 is a top view of one of the blades of the fan shown in FIG. 1.
FIG. 7 is an end-on view of one of the blades of the fan shown in FIG. 1.

FIGS. 5–7 show one of the blades 10 of the fan of FIG. 1 in greater detail. The blade is seen to have its root end 11 mounted to the fan motor rotor hub 12 with its tip end 13 located distally of the hub. The hub rotates about the axis of the downrod from the ceiling as shown in FIG. 1 which is substantially vertical. As most clearly noted by the blade centerline 15, the blade has a 0° dihedral at its root end 11 and a 10° dihedral $d^r$ at its tip 13. The fan blade here is continuously arched or curved from end to end so that its dihedral is continuously changing from end to end. As shown by the air flow distribution broken lines in FIG. 1 this serves to distribute air both directly under the fan as well as in the ambient air space that surrounds this space. Conversely, fans of the prior art have mostly directed the air downwardly beneath the fan with air flow in the surrounding space being indirect and weak. Though those fans that have had their blades inclined at a fixed dihedral throughout their length have solved this problem, such has been at the expense of diminished air flow directly under the fan.

The blade dihedral may increase continuously from end to end. However, it may be constant near its root end and/or near its tip with its arched or curved portion being along its remainder. Indeed, the most efficient design, referred to as the gull design, has a 0° dihedral from its root end to half way to its tip, and then a continuously increasing dihedral to its tip where it reaches a dihedral of 10°. In the preferred embodiment shown the blade root end has a 0° dihedral and its tip a 10° dihedral. However, its root end dihedral may be less than or more than 0° and its tip less than or more than 10°. Fan size, power, height and application are all factors that may be considered in selecting specific dihedrals.

Figure 4:
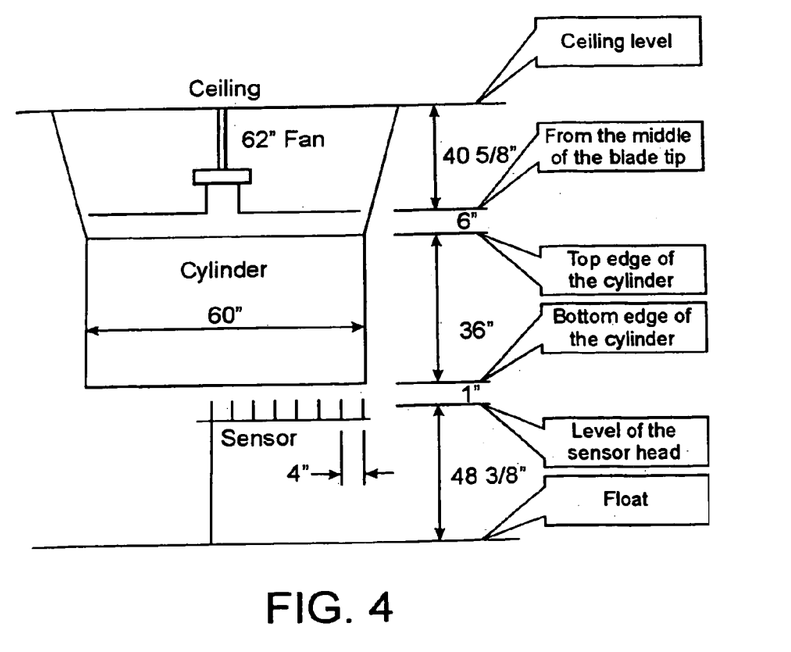
FIG. 4 is a diagram of air flow test parameters.

The fan was tested at the Hunter Fan Company laboratory which is certified by the environmental Protection Agency, for Energy Star Compliance testing. The fan was tested in accordance with the Energy Star testing requirements except that air velocity sensors were also installed over the top and close to the fan blades. This allowed for the measurement of air velocity adjacent to the fan blade. During the testing it was determined that the velocity of the air is different at various places on the fan blades from root end to tip end. Test parameters are shown in FIG. 4. The actual test results appear in Table 1.

TABLE 1

| Sensor | Avg. Vel. FPM | Air V FPS | Rotor Vel FPS | Resultant Vel | Resultant Angle | Deg/inch |
|---|---|---|---|---|---|---|
| 0 | 283 | 4.7 | 22.7 | 23.2 | 11.7 | |
| 1 | 303 | 5.1 | 24.4 | 24.9 | 11.7 | 0.07 |
| 2 | 320 | 5.3 | 26.2 | 26.7 | 11.5 | 0.16 |
| 3 | 325 | 5.4 | 27.9 | 28.4 | 11.0 | 0.54 |
| 4 | 320 | 5.3 | 29.7 | 30.1 | 10.2 | 0.79 |
| 5 | 313 | 5.2 | 31.4 | 31.8 | 9.4 | 0.76 |
| 6 | 308 | 5.1 | 33.1 | 33.5 | 8.8 | 0.63 |
| 7 | 305 | 5.1 | 34.9 | 35.3 | 8.3 | 0.51 |
| 8 | 290 | 4.8 | 36.6 | 37.0 | 7.5 | 0.77 |
| 9 | 275 | 4.6 | 38.4 | 38.7 | 6.8 | 0.71 |
| 10 | 262 | 4.4 | 40.1 | 40.4 | 6.2 | 0.60 |
| 11 | 235 | 3.9 | 41.9 | 42.0 | 5.3 | 0.87 |
| 12 | 174 | 2.9 | 43.6 | 43.7 | 3.8 | 1.54 |
| 13 | 132 | 2.2 | 45.4 | 45.5 | 2.8 | 1.03 |

Comparative test results appear in Table 2 where blade 1 was the new one just described with a 10° fixed dihedral, blade 2 was a Hampton Bay Gossomer Wind/Windward blade of the design taught by U.S. Pat. No. 6,039,541, and blade 3 was a flat blade with a 15° fixed angle of attack. The tabulated improvement was in energy efficiency as previously defined.

TABLE 2

| | Blade Motor | With Cylinder | Improvement Over Hampton Bay | Improvement Over Standard | Without cylinder | Improvement Over Hampton Bay | Improvement Outside 4 ft |
|---|---|---|---|---|---|---|---|
| 1 | 172 × 18 AM | 12,878 | 21% | 29% | 37,327 | 24% | 27% |
| 2 | 188 × 15 | 10,639 | NA | 6% | 30,034 | NA | NA |
| 3 | 172 × 18 AM | 10,018 | -6% | NA | 28,000 | -7% | -7% |

Figure 8:
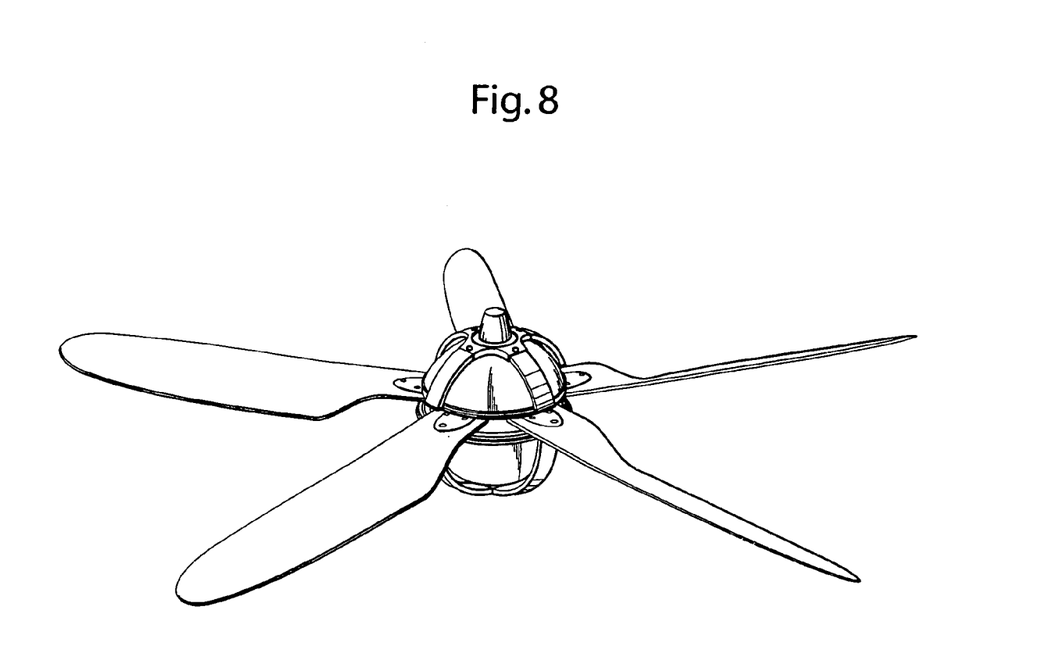
FIG. 8 is a perspective view of a ceiling fan that embodies the invention in another preferred embodiment.
Figure 9:
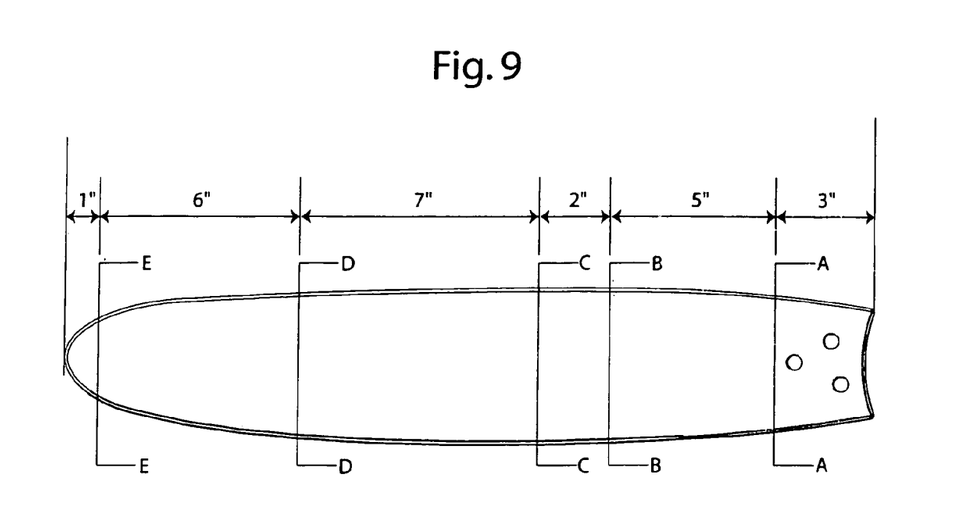
FIG. 9 is a diagrammatical view of a fan blade of FIG. 8 shown hypothetically in a planar form for illustrative purposes.
Figure 10:
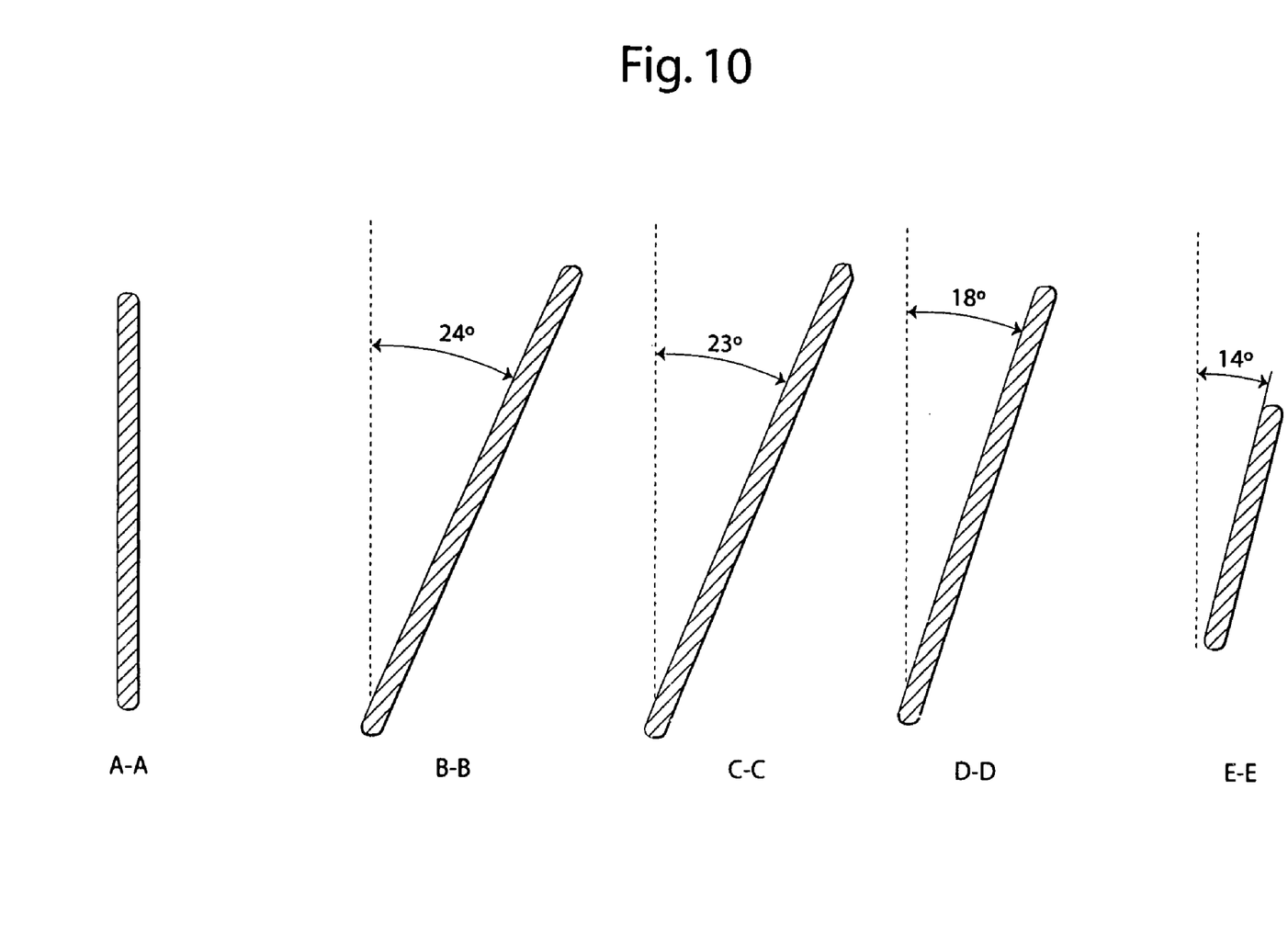
FIG. 10 is a series of diagrammatical view of the fan blade of FIG. 8 illustrating degrees of blade twist at different locations along the blade.

With reference next to FIGS. 8-10, there is shown a ceiling fan having blades incorporating the present invention in another preferred form. Here, it is seen that the blade is demarked to have six sections although the blade is, of course, of unitary construction. Here the 24-inch long blade has six sections of various lengths. The first section adjacent the root is approximately 3 inches, the second section is approximately 5 inches, the third section is approximately 2 inches, the fourth section is approximately 7 inches the fifth section is approximately 7 inches and the sixth section is approximately 1 inch. All sections except for the first section are twisted as is evident in FIGS. 8–10. However the rate of twist is nonuniform. The twist or angle of attack deceases from inboard portion of the third section to the tip end. This decrease, however, which is also apparent in FIG. 1, is at two different rates. In the third section the change in twist rate is approximately 0.5° per inch. For the fourth, fifth and sixth sections it is approximately 0.7° per inch. Of course there is a small transition between the sections of negligible significance. Thus, in FIG. 10 the third section commences at a 24° angle of attack and ends at a 23° angle of attack, thus there is an 1° difference in angle of attack from one end of the third section to its other (1° per inch×2 inches). The fourth section commences at a 23° angle of attack and ends at a 18° angle of attack, thus there is an 5° difference in angle of attack from one end of the fourth section to its other (5° per inch×7 inches). The fifth section commences at a 18° angle of attack and ends at a 14° angle of attack, thus there is an 4° difference in angle of attack from one end of the fifth section to its other (4° per inch×6 inches)

It should be understood that the second embodiment is similar in principle to the first embodiment shown in FIG. 1 except for the fact that the blade root commences horizontally then dips down before commencing the blade's normal angle of attack. This difference stems from the blade being mounted generally perpendicular to the motor axis at the actual root rather than the blade initially being set at an angled to the motor axis, i.e.; the blade initially having an angle of attack. However, it should be understood that in the second embodiment the "root" may simply be thought of as being positioned outboard from the actual "root" or actual inboard end of the blade. Thus, as used herein the term "root" may also be considered the position along the fan adjacent the fan axis wherein the angle of attack to produce the desired air flow commences, which in this embodiment is the inboard portion of the third section.

It thus is seen that a ceiling fan now is provided of substantially higher energy efficiency than those of the prior art and with enhanced flow distribution. The fan may of course be used in other locations such as a table top. Although it has been shown and described in its preferred form, it should be understood that other modifications, additions or deletions may be made thereto without departure from the spirit and scope of the invention as set forth in the following claims.

The invention claimed is:

1. A high efficiency ceiling fan having a plurality of fan blades mounted for rotation about a fan axis of blade rotation and with the blades having a root end and a tip end, and wherein each said blade has an air flow creating portion spaced from said root end, said air flow creating portion having a root and a tip distal said fan axis, and with the rate of change in angle of attack between said root and said tip being non-uniform, the blade angle of attack decreasing continuously from said root to said tip and wherein the blade angle of attack decreases at a plurality of incrementally different rates from said root to said tip.

2. The high efficiency ceiling fan of claim 1 wherein the blade angle of attack decreases in two different incrementally fixed rates.

3. A high efficiency ceiling fan having a plurality of fan blades mounted for rotation about a fan axis of blade rotation and with the blades being twisted at a plurality of fixed rates of decrease as they extend from a position adjacent the fan axis at a twist rate that decreases non-uniformly from a position adjacent the motor to the blade tip end.

4. The high efficiency ceiling fan of claim 3 wherein the blade angle of attack decreases in two different incrementally fixed rates.

* * * * *

(12) INTER PARTES REEXAMINATION CERTIFICATE (0246th)
United States Patent
Bird (10) Number: US 7,131,819 C1
(45) Certificate Issued: Mar. 8, 2011

(54) HIGH EFFICIENCY CEILING FAN

(75) Inventor: Gregory Michael Bird, Collierville, TN (US)

(73) Assignee: Goldman Sachs Credit Partners L.P., Jersey City, NJ (US)

Reexamination Request:
No. 95/000,270, Jun. 26, 2007

Reexamination Certificate for:
Patent No.: 7,131,819
Issued: Nov. 7, 2006
Appl. No.: 11/326,908
Filed: Jan. 7, 2006

Related U.S. Application Data (63) Continuation of application No. 10/837,934, filed on May 3, 2004, now abandoned, which is a continuation-in-part of application No. 10/194,699, filed on Jul. 11, 2002, now Pat. No. 6,733,241.

(51) Int. Cl.
*F04D 29/38* (2006.01)

(52) U.S. Cl. .......................... 416/238; 416/243
(58) Field of Classification Search ................. 416/238, 416/242, 243, 223 R, DIG. 2, DIG. 5
See application file for complete search history.

(56) References Cited

U.S. PATENT DOCUMENTS

| | | | | |
|---|---|---|---|---|
| 3,416,725 A | * | 12/1968 | Bohanon | 416/242 |
| 4,569,632 A | | 2/1986 | Gray | |
| 4,844,698 A | * | 7/1989 | Gornstein et al. | 416/223 R |
| 5,681,145 A | * | 10/1997 | Neely et al. | 416/203 |
| 5,769,607 A | * | 6/1998 | Neely et al. | 416/189 |
| 7,014,423 B2 | * | 3/2006 | Parker et al. | 415/220 |

FOREIGN PATENT DOCUMENTS

EP 992693 A1 * 4/2000

* cited by examiner

*Primary Examiner*—Zoila E Cabrera (57) ABSTRACT

Ceiling fan energy consumption efficiency is enhanced with fan blades that have an angle attack that decreases from root end to tip end at higher rates of decrease nearer their tip ends than at their root ends.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 26 to 43:

With continued reference to FIGS. 2 and 3 it is seen that the blade is demarked to have three sections although the blade is, of course, of unitary construction. Here the 24-inch long blade has three sections of equal lengths, i.e. 8 inches each. All sections are twisted as is evident in FIG. 1. However the rate of twist from root to tip is nonuniform. The twist or angle of attack [deceases] *decreases* from root end down to 10° at the tip end. This decrease, however, which is also apparent in FIG. 1, is at three different rates. In the first 8-inch section adjacent the root end the change in twist rate is 0.4° per inch. For the mid section it is 0.7° per inch. For the third section adjacent the tip it is at a change rate of 1.0° per inch. Of course there is a small transition between each section of negligible significance. Thus in FIG. 3 there is an 8° difference in angle of attack from one end of the outboard section to its other (1° per inch×8 inches). For the mid section there is about 6° difference and for the inboard section about 3°.

Column 5, lines 1-28:

With reference next to FIGS. 8-10, there is shown a ceiling fan having blades incorporating the present invention in another preferred form. Here, it is seen that the blade is demarked to have six sections although the blade is, of course, of unitary construction. Here the 24-inch long blade has six sections of various lengths. The first section adjacent the root is approximately 3 inches, the second section is approximately 5 inches, the third section is approximately 2 inches, the fourth section is approximately 7 inches, the fifth section is approximately 7 inches and the sixth section is approximately 1 inch. All sections except for the first section are twisted as is evident in FIGS. 8-10. However, the rate of twist is nonuniform. The twist or angle of attack [deceases] *decreases* from *an* inboard portion of the third section to the tip end. This decrease, however, which is also apparent in FIG. 1, is at two different rates. In the third section the change in twist rate is approximately 0.5 ° per inch. For the fourth, fifth and sixth sections it is apprioximately 0.7° per inch. Of course there is a small transition between the sections of negligible significance. Thus, in FIG. 10 the third section commences at a 24° angle of attack and ends at a 23° angle of attack, thus there is [an] *a* 1° difference in angle of attack from one end of the third section to its other (1° per inch×2 inches). The fourth section commences at a 23° angle of [attach] *attack* and ends at a 18° angle of attack, thus there is [an] *a* 5°, difference in angle of attack from one end of the fourth section to its other (5° per inch×7 inches). The fifth section commences at a 18° angle of [attach] *attack* and ends at a 14° angle of attack, thus there is [an] *a* 4° difference in angle of attack from one end of the fifth section to its other (4° per inch×6 inches).

AS A RESULT OF REEXAMINATION, IT HAS BEEN DETERMINED THAT:

Claims 1-4 are cancelled.

\* \* \* \* \*